(12) United States Patent
Kondoh

(10) Patent No.: US 8,118,156 B2
(45) Date of Patent: Feb. 21, 2012

(54) ACOUSTIC WAVE DEVICE

(75) Inventor: Jun Kondoh, Hamamatsu (JP)

(73) Assignee: National University Corporation Shizuoka University (JP)

( * ) Notice: Subject to any disclaimer, the term of this patent is extended or adjusted under 35 U.S.C. 154(b) by 98 days.

(21) Appl. No.: 12/676,107

(22) PCT Filed: Sep. 1, 2008

(86) PCT No.: PCT/JP2008/002392
§ 371 (c)(1),
(2), (4) Date: Mar. 2, 2010

(87) PCT Pub. No.: WO2009/031290
PCT Pub. Date: Mar. 12, 2009

(65) Prior Publication Data
US 2010/0206696 A1    Aug. 19, 2010

(30) Foreign Application Priority Data
Sep. 3, 2007 (JP) ................ P2007-228404

(51) Int. Cl.
*B65G 35/00* (2006.01)
(52) U.S. Cl. .......... 198/619; 198/630; 310/313 R
(58) Field of Classification Search ........... 198/619, 198/630; 134/1, 3; 310/313 R, 313 A, 313 B, 310/313 C, 313 D
See application file for complete search history.

(56) References Cited

U.S. PATENT DOCUMENTS

| | | | |
|---|---|---|---|
| 6,722,781 B2 * | 4/2004 | Bazhenov et al. | 198/502.1 |
| 7,764,005 B2 * | 7/2010 | Xu et al. | 310/313 R |
| 7,870,946 B2 * | 1/2011 | Zimmermann et al. | 198/630 |
| 2005/0217978 A1 * | 10/2005 | Fujinaga et al. | 198/619 |
| 2009/0014283 A1 * | 1/2009 | Zimmermann et al. | 198/630 |
| 2010/0219047 A1 * | 9/2010 | Xu et al. | 198/617 |

FOREIGN PATENT DOCUMENTS

JP          1-106453          7/1989
(Continued)

OTHER PUBLICATIONS

Renaudin, A., et al., "SAW nanopump for handling droplets in view of biological applications," Sensors and Actuators B113, pp. 389-397, May 23, 2005.
Sritharan, K., et al., "Acoustic mixing at low Reynold's numbers," Applied Physics Letters 88, 054102, pp. 054102-1 to 054102-3, Feb. 2, 2006.
Kondoh, Jun and Sugiura, Tetsuji, "Liquid-Phase Sensor Using Guided SH-SAW," Proc. Symp. Ultrason. Electron., vol. 26, pp. 69-70, Nov. 16, 2005.
International Search Report issued Oct. 28, 2008.

*Primary Examiner* — James R Bidwell
(74) *Attorney, Agent, or Firm* — Ostrolenk Faber LLP

(57) ABSTRACT

An acoustic wave device applicable to a wider scope and field and used for transporting a substance of any of wide variety of types to be transported with an improved efficiency without needing to clean a piezoelectric substrate and simultaneously transporting two or more physically separated substances along the propagation direction of a surface acoustic wave. An acoustic wave device has an exciting electrode for exciting a surface acoustic wave formed on a piezoelectric substrate generating a surface acoustic wave by a piezoelectric effect. A transport path plate is disposed adjacently to the exciting electrode over the piezoelectric substrate with a water layer (W) interposed therebetween. When current is supplied to the exciting electrode, a surface acoustic wave is generated on the piezoelectric substrate. The surface acoustic wave causes a longitudinal wave to be emitted into the water layer (W) and attenuates. The emitted longitudinal wave is propagated to the transport path plate, and a droplet (Dp) placed on the transport path plate is displaced by the emission pressure.

12 Claims, 8 Drawing Sheets

FOREIGN PATENT DOCUMENTS

| | | |
|---|---|---|
| JP | 2004-173409 | 6/2004 |
| JP | 2006-226942 | 8/2006 |
| JP | 2006-248751 | 9/2006 |
| JP | 2007-53890 | 3/2007 |

* cited by examiner

ACOUSTIC WAVE DEVICE

CROSS-REFERENCE TO RELATED APPLICATION

The present application is a 35 U.S.C. §371 national phase conversion of PCT/JP2008/002392 filed Sep. 1, 2008 and claims priority of JP2007-228404 filed Sep. 3, 2007, incorporated herein in their entirety.

TECHNICAL FIELD

This invention relates to an acoustic wave device, which utilizes surface acoustic waves generated on a substrate by a piezoelectric effect to transport substances to be transported, and which can perform sensing of the substance to be transported that is in transportation.

BACKGROUND ART

In the prior art, there have been acoustic wave devices which utilize surface acoustic waves to transport liquid drops and other substances for transport. Acoustic wave devices which transport substances for transport comprise, for example as described in Patent Reference 1 below, a piezoelectric substrate which generates surface acoustic waves by means of the piezoelectric effect, on which is placed an excitation electrode to excite the surface acoustic waves. And, by applying high-frequency signals to this excitation electrode, surface acoustic waves are generated on the piezoelectric substrate, and a substance to be transported placed on the piezoelectric substrate is caused to be displaced. Surface acoustic waves (SAWs) are waves comprising longitudinal waves and transverse waves, and propagate on the surface of an elastic body. The piezoelectric effect is a phenomenon in which, when a force or an electric field is applied to quartz or another crystal, a voltage or strain occurs corresponding to the stress or to the electric field.

Patent Reference 1: Japanese Patent Application Laid-open No. 2006-248751

However, in an acoustic wave device which transports substances for transport in this way, in order to place a substance to be transported on a piezoelectric substrate and transport the substance, the transport path over which the substance to be transported is transported must be cleaned each time a substance to be transported is transported. In particular, when the substrate for transport is a liquid, a portion of the substance to be transported which has been transported on the transport path easily remains, and the task of cleaning is troublesome. Hence there has been the problem that the efficiency of the overall task of transporting a substance to be transported by means of an acoustic device is poor. Further, transport of a substance to be transported having properties which cause degradation of or damage to the piezoelectric substrate is difficult, and so there has been the problem that the range of selection of substances for transport is effectively limited.

Further, in an acoustic wave device of the prior art, it has not been possible to simultaneously transport two or more substances for transport existing physically separated along the direction of propagation of surface acoustic waves. This is attributed to attenuation of surface acoustic waves due to substances for transport positioned on the upstream side of the propagation of surface acoustic waves. As a result, there has also been the problem that the range of application and fields of application of acoustic wave devices have been limited.

In order to mitigate the trouble involved in the task of cleaning the transport path, Patent Reference 2 below proposes a acoustic wave device in which a sensing region, which detects the physical quantity of the substance to be transported on the transport path of the substance to be transported is provided on the piezoelectric substrate, and moreover an excitation electrode is comprised to provide cleaning liquid to the transport path and the sensing region. However, merely causing cleaning liquid to pass through the transport path and sensing region does not result in an adequate cleaning effect, and moreover a task to remove the cleaning liquid remaining on the transport path and sensing region becomes necessary, so that this proposal is insufficient as means of resolution to mitigate the trouble of the cleaning task.

Patent Reference 2: Japanese Patent Application Laid-open No. 2006-226942

DISCLOSURE OF THE INVENTION

This invention was devised to address the above problems, and has as an object the provision of an acoustic wave device which can eliminate the need for piezoelectric substrate cleaning tasks and improve the efficiency of the task of transporting substances for transport, which can handle a wide range of types of substances for transport, and moreover which can expand the range of application and fields of application of acoustic wave devices, by enabling simultaneous transport of two or more substances for transport, existing physically separated along the direction of propagation of the surface acoustic waves.

In order to attain the above object, this invention is characterized by an acoustic wave device, which has a piezoelectric substrate that generates surface acoustic waves by means of the piezoelectric effect and an excitation electrode that excites surface acoustic waves on the surface of the piezoelectric substrate, and in which the surface acoustic waves generated on the surface of the piezoelectric electrode by the excitation electrode are used to transport a substance to be transported, wherein a transport path plate, forming a transport path for the substance to be transported, is placed on the propagation face on which propagate surface acoustic waves generated on the surface of the piezoelectric substrate, with a liquid layer interposed between the transport path plate and the piezoelectric substrate.

In this case, in the acoustic wave device, the liquid layer may be formed to a thickness of for example several micrometers or greater and several tens of micrometers or less. Also, the liquid layer may be formed from an incompressible fluid which is not readily volatilized, such as for example water. In this case, an incompressible fluid is a fluid having a compressibility, in a 15° C. environment, of approximately $2 \times 10^{-9}$ ($1/N/m^2$) or below. Here compressibility is volume strain/pressure ($1/N/m^2$), where volume strain is (change in volume of the fluid by compression)/(volume of the fluid before compression). The compressibility of water in a 15° C. environment is $5 \times 10^{-10}$ ($1/N/m^2$).

According to such characteristics of the invention with this configuration, a transport path plate, forming the transport path for substances for transport, is placed on the propagation face on which surface acoustic waves propagate, with a liquid layer therebetween. By this means, surface acoustic waves generated on the surface of the piezoelectric substrate propagate through the liquid layer to the transport path plate, and cause displacement of the substance to be transported on the transport path plate. In this case, the transport path plate is merely fixed onto the propagation face by the surface tension of the liquid layer. That is, attachment and detachment of the transport path plate to and from the propagation face is extremely easy. Hence in cases in which a plurality of substances for transport are to be transported in sequence, a new transport path can easily be formed by replacement with a new transport path plate for each transport of a substance to be transported. Further, a transport plate can be prepared according to the characteristics of the substance to be transported, so that even substances which cause degradation of or damage to the piezoelectric substrate, as in the prior art, can be transported. As a result, piezoelectric substrate cleaning tasks become unnecessary and the efficiency of tasks to transport substances for transport is improved, and moreover a wide range of types of substances for transport can be handled.

Further, a surface acoustic wave generated by a piezoelectric substrate radiates longitudinal waves in a water layer W. These longitudinal waves propagate in the transport plate while propagating in the water layer. That is, in the transport path plate, longitudinal wave propagate from the portion in contact with the water layer. Hence even a substance to be transported positioned on the downstream side of propagating surface acoustic waves can be caused to be displaced. As a result, two or more substances for transport, existing physically separated along the direction of propagation of the surface acoustic waves, can be transported simultaneously, and the range of application and fields of application of acoustic wave devices can be expanded.

Also, in this case in the acoustic wave device, the transport path plate may for example comprise an object which transmits light rays. By this means, after transport of the substance to be transported, the transport path plate can be removed from the propagation face, the substance to be transported can be irradiated with light, and characteristics of the substance to be transported can be investigated. Also, the substance to be transported can also be observed using a microscope or similar. And, even when a used transport path plate is cleaned and reused, the extent of degradation of, damage to, and cleaning of the transport plate can easily be checked. By this means, the range of application and fields of application of acoustic wave devices can be expanded.

Also, a further characteristic of this invention is the comprising, in the acoustic wave device, of a sensor which detects a physical quantity related to the substance to be transported on the transport path plate. In this case, a physical quantity related to a substance to be transported is a quantity, specific to the substance for measurement, which can be objectively measured, or a quantity which can be calculated from such a quantity, and may for example be mass, length, temperature, position, velocity, magnetic field, electrical resistance or electrical capacity or other electrical characteristics, optical transmissivity or reflectivity or other optical characteristics, radiation quantity or other X-rays related characteristics, and similar.

According to such characteristics of the invention with this configuration, in addition to the above-described advantageous results, the properties of a substance to be transported can be investigated in addition to transporting the substance to be transported, so that the range of application and fields of application of acoustic wave devices can be expanded.

Also, in this case in the acoustic wave device, the sensor may for example be placed on the transport path plate. By this means, if a transport path plate is prepared for each type of measurement of a substance to be transported, the piezoelectric substrate with excitation electrode provided can be used in common in a plurality of measurements. That is, various measurements of a substance to be transported can be performed economically.

Also, in this case in the acoustic wave device, an excitation electrode may be placed at a position on the piezoelectric substrate corresponding to a sensor placed on the transport path plate. By this means, even when the position of measurement of a substance to be transported is distant from the excitation electrode which transports the substance for measurement to the position of measurement, the measured substance to be transported can be further transported to the next region. By this means, the range of application and fields of application of acoustic wave devices can be expanded.

Also, in this case in the acoustic wave device, a control device which controls operation of the excitation electrode and the sensor may further be comprised. By this means, transport of a substance to be transported to a measurement region, measurement in the measurement region, and ejection from the measurement region, can be automated. By this means, measurements using an acoustic wave device can be performed efficiently, and the range of application and fields of application of acoustic wave devices can be expanded.

Also, in each of the acoustic wave devices described above, the transport path plate may for example be placed in a state protruding from the propagation face. By this means, compared with conventional acoustic wave devices, the transportable range of a substance to be transported of which has been limited to the piezoelectric substrate, the transportable range of a substance to be transported can be expanded economically. As a result, the range of application and fields of application of acoustic wave devices can be expanded.

Also, in each of the acoustic wave devices described above, a plurality of excitation electrodes may for example be placed on the piezoelectric substrate. By this means, by for example providing excitation electrodes for each of a plurality of substances for transport, each of the substances for transport can be transported, and moreover the substances for transport can be intermixed and transported. Also, in this case, the plurality of excitation electrodes may be placed at positions and in orientations in order to transport substances for transport by means of the synthesis or combination of surface acoustic waves excited by each of the different excitation electrodes. By this means, by for example synthesizing or combining a plurality of surface acoustic waves using a plurality of excitation electrodes, the direction of transport of substances for transport can be controlled.

Here, a case in which surface acoustic waves are synthesized and a substance to be transported is transported is a case in which two or more surface acoustic waves with different propagation directions and magnitudes are simultaneously applied to a specific substance to be transported, to transport the substance while adjusting the transport direction and the transport velocity of the transported substance. Also, a case in which surface acoustic waves are combined to transport a substance to be transported is a case in which two or more surface acoustic waves with different propagation directions and magnitudes are applied to a substance to be transported with different timings, to transport the substance while adjusting the transport direction and the transport velocity of the transported substance. As a result of these, the range of application and fields of application of acoustic wave devices can be expanded.

Also, in each of the acoustic wave devices described above, the transport path plate may for example comprise a guide that guides the substance to be transported in a prescribed direction. In this case, a guide may for example be a guide groove. Also, when the substance to be transported is a liquid, a hydrophilic substance may be applied onto the transport path plate along the transport path. By this means, substances for transport can be transported more precisely.

EXPLANATION OF REFERENCE NUMERALS

Dp: liquid drop, W: water layer, 100, 200, 300, 400: acoustic wave device, 101: piezoelectric substrate, 102: excitation electrode, 103: electric wiring, 104: AC power supply, 105, 205: transport path plate, 107: guide, 108a: laser light source, 108b: photodetector, 206a, 206b: electrode, 207: LCR meter

BEST MODE FOR CARRYING OUT THE INVENTION

Figure 1A:
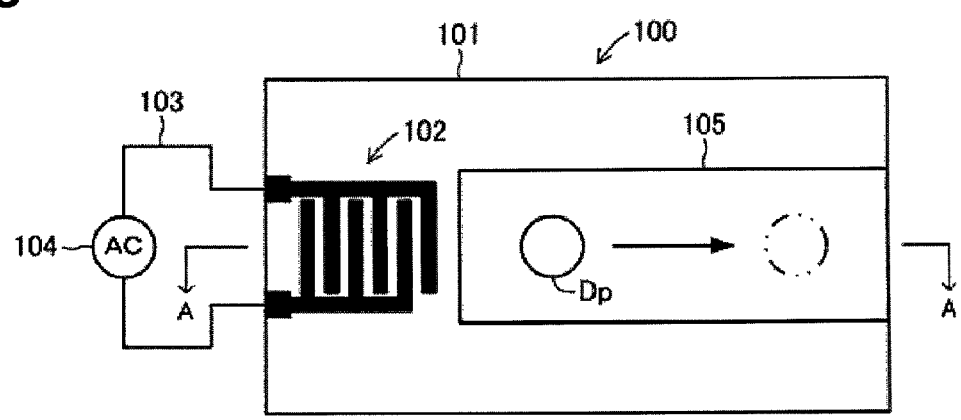
FIGS. 1 (A) and (B) schematically show the configuration of the acoustic wave device of one embodiment of the invention, in which (A) is a summary plane view of the acoustic wave device, and (B) is a summary cross-sectional view showing the cross-sectional shape of the acoustic wave device as seen from the direction of line A-A in (A)
Figure 1B:
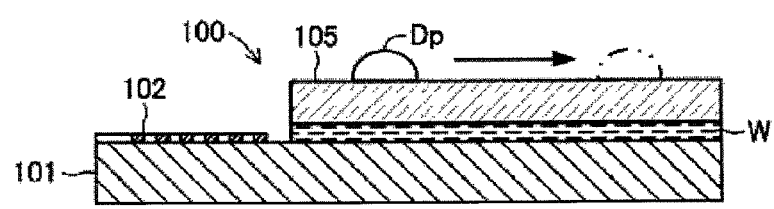

Below, an embodiment of an acoustic wave device of the invention is explained, referring to the drawings. FIGS. 1 (A) and (B) are summary views schematically showing the configuration of an acoustic wave device 100 of this invention. Diagrams showing each of the embodiments and modified examples, including (A) and (B) of FIG. 1, are schematic diagrams, and emphasize a portion of the constituent elements in order to facilitate understanding of the invention; the dimensions and proportions of the constituent elements are different. This acoustic wave device 100 is a device which utilizes surface acoustic waves to transport liquid drops Dp in a prescribed direction (the direction of the arrow shown). Here, a surface acoustic wave (SAW) is a wave, comprising a longitudinal wave and a transverse wave, which propagates on the surface of an elastic body.

The acoustic wave device 100 comprises a piezoelectric substrate 101 formed into a square plate shape. The piezoelectric substrate 101 is formed from a crystalline body which generates surface acoustic waves or quasi-acoustic waves through the piezoelectric effect, such as for example lithium niobate (LiNbo$_3$), lithium tantalate (LiTao$_3$), quartz, langasite, or similar. As the piezoelectric substrate 101, PZT or another piezoelectric ceramic material, as well as zinc oxide (ZnO), aluminum nitride (AlN), or another piezoelectric thin film, layered on the entire face of or a portion of the surface of a substrate comprising glass, silicon, or similar, may be employed. Also, a polymer substrate in which the piezoelectric effect occurs can be used. The piezoelectric effect is a phenomenon in which, when a force or an electric field is applied to quartz or another crystal, a voltage or strain occurs corresponding to the stress or to the electric field; in this embodiment, by applying an electric field to the piezoelectric substrate 101, electrostrictive strain occurs according to the electric field.

A pair of excitation electrodes 102 are provided on the upper face of one end portion (in the figure, on the left side) of the piezoelectric substrate 101. The excitation electrodes 102 are electrodes used to excite surface acoustic waves in the piezoelectric substrate 101, and are formed as two comb-shaped electrodes. Specifically, two electrodes, comprising pluralities of electrode fingers extending in parallel in the direction perpendicular to base portions extending in straight lines, are formed in a state in which the electrode fingers are mutually interlaced. These excitation electrodes 102 are formed from a simple metal such as Al, Au, Cu, Cr, Ti, Pt, or similar, or from an alloy of these, and are provided in an orientation which causes excitation of surface acoustic waves in the direction of transport of liquid drops Dp. The excitation electrodes 102 are formed on the surface of the piezoelectric substrate 102 by photolithography, a sputtering method, or similar.

The excitation electrodes 102 are connected via electric wiring 103 to an AC power supply 104. The AC power supply 104 is a power supply device which outputs alternating-current electric signals at a prescribed frequency. In this embodiment, alternating-current electric signals at frequency 50 kHz are output. The electric wiring 103 and AC power supply 104 are omitted from FIG. 1 (B) and subsequent figures.

The transport path plate 105 is placed on the piezoelectric substrate 101, in the direction of advance of surface acoustic waves excited by the excitation electrodes 102, with the water layer W therebetween. The transport path plate 105 is a plate material forming the face on which liquid drops Dp are transported, and is formed from glass material formed in a square plate shape. The water layer W provided between this transport path plate 105 and the piezoelectric substrate 101 is a layer of water of thickness approximately 50 μm. The transport path plate 105 is fixed on the piezoelectric substrate 101 by means of the surface tension of the water layer W.

Next, operation of an acoustic wave device configured in this way is explained. First, an operator prepares a transport path plate 105 and water. Then, after applying the water to the face of the transport path plate 105 opposite the face onto which a liquid drop Dp will be placed, the operator places the face with the water applied onto the upper face of the piezoelectric substrate 101 in a state of opposition. By this means, the water layer W is formed between the piezoelectric substrate 101 and the transport path plate 105, and moreover the transport path plate 105 is fixed on the piezoelectric substrate 101 by means of the surface tension of the water layer W.

Next, the operator places the liquid drop Dp onto the edge portion of the transport path plate 105 on the side of the excitation electrodes 102. In this embodiment, a water drop of diameter approximately 3 mm is the water drop Dp. And, the operator begins transport of the liquid drop Dp placed onto the transport path plate 105. In this embodiment, the liquid drop Dp is transported from the left edge in the figure to the right edge in the figure of the transport path plate 105. The operator starts operation of the AC power supply 104 to generate surface acoustic waves on the piezoelectric substrate 101. Surface acoustic waves generated on the piezoelectric substrate 101 propagate on the surface of the piezoelectric substrate 101 toward the side of the transport path plate 105

(the right side in the figure). And, surface acoustic waves which have reached the water layer W radiate longitudinal waves in the water layer W while being attenuated over 5 to 10 wavelengths and being annihilated.

Longitudinal waves which propagate in the water layer W are reflected between the piezoelectric substrate 101 and the transport path plate 105 in the water layer W while propagating toward the right side in the figure. In this case, a portion of the longitudinal waves propagating in the water layer W reaches the liquid drop Dp on the transport path plate 105 via the transport path plate 105. By this means, the liquid drop Dp begins displacement toward the right side in the figure on the transport path plate 105 due to the radiation pressure occurring in the liquid drop Dp. According to experiments by this inventor, the liquid drop Dp was displaced at a speed of approximately 1 cm/s. A liquid drop Dp which begins displacement continues displacement toward the right side in the figure while surface acoustic waves are occurring. Hence the operator halts the generation of surface acoustic waves by halting operation of the AC power supply 104 when the liquid drop Dp has reached the desired position on the transport path plate 105 (the position showing the liquid drop Dp by the two-dot chain line). By this means, displacement of the liquid drop Dp which has been continuing displacement is halted.

The operator performs prescribed treatment of the halted liquid drop Dp, such as for example observation with a microscope, or various types of measurements. And, when a new liquid drop Dp is to be transported, the operator removes the transport path plate 105 fixed to the piezoelectric substrate 101, and fixes a new transport path plate 105 onto the piezoelectric substrate 101. In this case, the transport path plate 105 fixed onto the piezoelectric substrate 101 is fixed only by the surface tension of the water layer W, and so can easily be removed. And, when setting a new transport path plate 105 on the piezoelectric substrate 101, after applying water to the face of the new transport path plate 105 opposite the face on which the liquid drop Dp is to be placed, the face with the water applied is placed onto the upper face of the piezoelectric substrate 101 in a state of opposition, similarly to the above description. In this case, the surface of the piezoelectric substrate 101 may be wetted by the water layer W of the previously removed transport path plate 105. Hence prior to placing the new transport path plate 105 thereonto, the surface of the piezoelectric substrate 101 may first be wiped, and then the new transport path plate 105 may be placed thereonto.

As can be understood from the above explanation of operation, in this embodiment, a transport path plate 105, forming the transport path of a liquid drop Dp, is placed on the piezoelectric substrate 101 in which surface acoustic waves propagate, with a liquid layer W therebetween. By this means, surface acoustic waves which have been generated at the surface of the piezoelectric substrate 101 propagate through the liquid layer W to the transport path plate 105, and cause displacement of the liquid drop Dp on the transport path plate 105. In this case, the transport path plate 105 is merely fixed on the piezoelectric substrate 101 by the surface tension of the liquid layer W. That is, attachment and detachment of the transport path plate 105 onto and from the piezoelectric substrate 101 is extremely easy. Hence when transporting in sequence a plurality of liquid drops Dp, by replacement with a new transport path plate 105 upon each transport of a liquid drop Dp, a new transport path can easily be formed. Further, a transport plate 105 can be prepared according to the characteristics of the liquid drop Dp, so that even a substance which causes degradation of or damage to the piezoelectric substrate 101, as in examples of the prior art, can be transported. As a result, the task of cleaning the piezoelectric substrate 101 becomes unnecessary, the efficiency of the task of transporting a liquid drop Dp is improved, and a wide range of types of liquid drops Dp can be handled.

Figure 2:
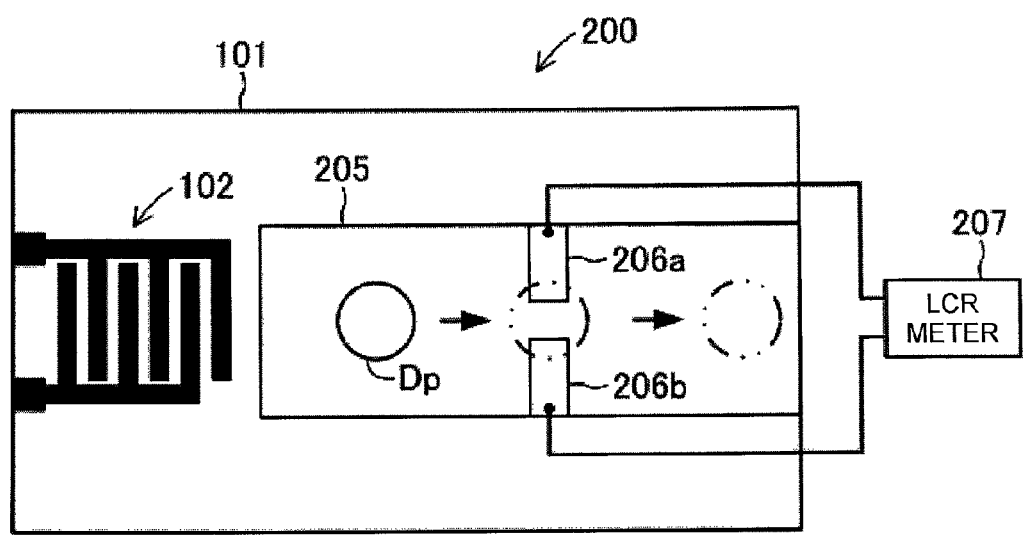
FIG. 2 is a summary plane view schematically showing the configuration of the acoustic wave device of another embodiment of the invention.

Next, another embodiment of the invention is explained. In the above embodiment, an acoustic wave device 100 to transport a liquid drop Dp was explained. However, in addition to transport of liquid drops Dp, measurements of the liquid drops Dp on the transport path plate 105 are also possible. An acoustic wave device 200 which can perform measurement of a liquid drop Dp on a transport path plate 105 is shown in FIG. 2. In FIG. 2, constituent portions similar to those of the acoustic wave device 100 in the above embodiment are assigned the same symbols, and explanations are omitted.

Similarly to the transport path plate 105, a transport path plate 205 is placed on the piezoelectric substrate 101 of this acoustic wave device 200, with a water layer W therebetween. Similarly to the transport path plate 105, the transport path plate 205 is formed from glass material formed in a square plate shape. In the center portion of the upper face of the transport path plate 205 are provided a pair of electrodes 206a, 206b, in a state of opposition in the vertical direction in the figure. An LCR meter 207 is connected to these electrodes 206a, 206b. The LCR meter 207 is an instrument which, by passing a current through a substance positioned between the electrode 206a and the electrode 206b, measures the electrical characteristics of the substance, and specifically, measures the reactance L, capacitance C, and resistance R. That is, the electrodes 206a, 206b are a sensor which measures electrical characteristics of a liquid drop Dp.

Operation of an acoustic wave device 200 configured in this way is explained. First, similarly to the above embodiment, an operator sets the transport path plate 205 on the piezoelectric substrate 101. Then, soldering or another means is used to connect the electrodes 206a, 206b of the transport path plate 205 to the LCR meter 207. Next, similarly to the above embodiment, the operator places a liquid drop Dp on the edge portion on the transport path plate 205 on the side of the excitation electrodes 102. And, similarly to the above embodiment, the operator begins transport of the liquid drop Dp placed on the transport path plate 205. That is, by starting operation of the AC power supply 104, the operator causes surface acoustic waves to be generated on the piezoelectric substrate 101, and starts displacement of the liquid drop Dp.

Next, the operator positions the liquid drop Dp on the electrodes 206a, 206b, that is, in the measurement region. Specifically, when the liquid drop Dp being displaced on the transport path plate 205 is positioned on the electrodes 206a, 206b, the operator halts operation of the AC power supply 104 and halts displacement of the liquid drop Dp (indicated by the two-dot chain line in the center in the figure). Next, the operator operates the LCR meter 207 to pass a current through the liquid drop Dp, and by this means measures the reactance L, capacitance C, and resistance R. By this means, the operator can investigate the properties of the liquid drop Dp based on the electrical characteristics of the liquid drop Dp. Next, the operator again starts operation of the AC power supply 104, and by this means causes surface acoustic waves to be generated on the piezoelectric substrate 101, and starts displacement of the liquid drop Dp. By this means, the liquid drop Dp is transported outside the measurement region (indicated by the two-dot chain line on the right edge in the figure).

And, when measurements are performed for a new liquid drop Dp, similarly to the above embodiment, the transport path plate 205 is replaced with a new one, after which measurements similar to those above are performed. That is, after the LCR meter 207 is disconnected from the electrodes 206a, 206b, the transport path plate 205 is removed from the piezoelectric substrate 101. And, a new transport path plate 205 is set on the piezoelectric substrate 101, and the LCR meter 207 is connected to the electrodes 206a, 206b.

As can be understood from the above explanation of operation, according to the other embodiment above, the transport path plate 205 is merely fixed onto the piezoelectric substrate 101 by the surface tension of the liquid layer W. That is, attachment and detachment of the transport path plate 205 to and from the piezoelectric substrate 101 is extremely easy. Hence in cases in which a plurality of liquid drops Dp are to be transported in sequence, a new transport path can easily be formed by replacement with a new transport path plate 205 for each transport of a liquid drop Dp. Further, on this new transport path plate 205, there is no adhesion whatsoever of the previously measured liquid drop Dp, so that measurements for the new liquid drop Dp can be preformed with good precision. Further, similarly to the above embodiment, a transport path plate 205 can be prepared according to the characteristics of the liquid drop Dp, so that even a substance which causes degradation of or damage to the piezoelectric substrate 101, as in examples of the prior art, can be transported and measured. As a result, the task of cleaning the piezoelectric substrate 101 becomes unnecessary, the efficiency of the task of transporting and measuring a liquid drop Dp is improved, and a wide range of types of liquid drops Dp can be handled.

Further, implementation of this invention is not limited to the above-described embodiments, and various applications and modifications are possible, so long as there is no deviation from the object of the invention.

Figure 3:
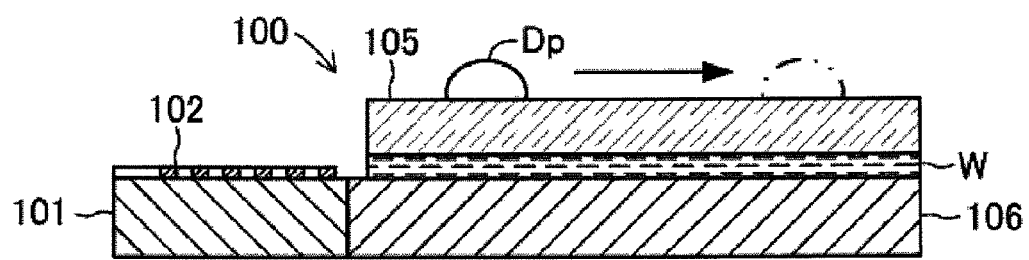
FIG. 3 is a summary cross-sectional view schematically showing the configuration of the acoustic wave device of a modified example of the invention.

In each of the above embodiments, transport path plates 105, 205 were placed on a piezoelectric substrate 101, with a water layer W therebetween. However, the placement position of the transport path plates 105, 205 is not limited thereto, so long as surface acoustic waves occurring due to the piezoelectric substrate 101 propagate on the face. For example, as shown in FIG. 3, a member 106 on which surface acoustic waves occurring due to the piezoelectric substrate 101 can propagate may be connected to the piezoelectric substrate 101, and the transport path plate 105 (205) may be placed on this member 106. By this means also, advantageous results similar to those of each of the above embodiments can be expected.

Further, in each of the above embodiments, the water layer W was formed from water. However, the water layer W is not limited thereto, so long as longitudinal waves radiated from the surface acoustic waves can propagate in the liquid. Specifically, any liquid which is not readily volatilized and which is incompressible may be used. In this case, an incompressible fluid is a fluid with compressibility, in a 15° C. environment, of approximately $2 \times 10^{-9}$ ($1/N/m^2$) or less. Compressibility is volume strain/pressure ($1/N/m^2$), where volume strain is (change in volume of the fluid by compression)/(volume of the fluid before compression). Hence, for example, the hydraulic oil used within a hydraulic device and similar can be employed.

Further, the thickness of the liquid layer W is also not limited to those of the above embodiments, so long as the thickness is such that longitudinal waves radiated from surface acoustic waves can propagate to the transport path plate 105, 205. According to various experiments performed by this inventor, when liquid drops Dp several millimeters in diameter are transported using alternating-current electric signals at a frequency of approximately 50 kHz, a thickness for the liquid layer W of several micrometers or greater and several tens of micrometers or less was appropriate.

Figure 4:
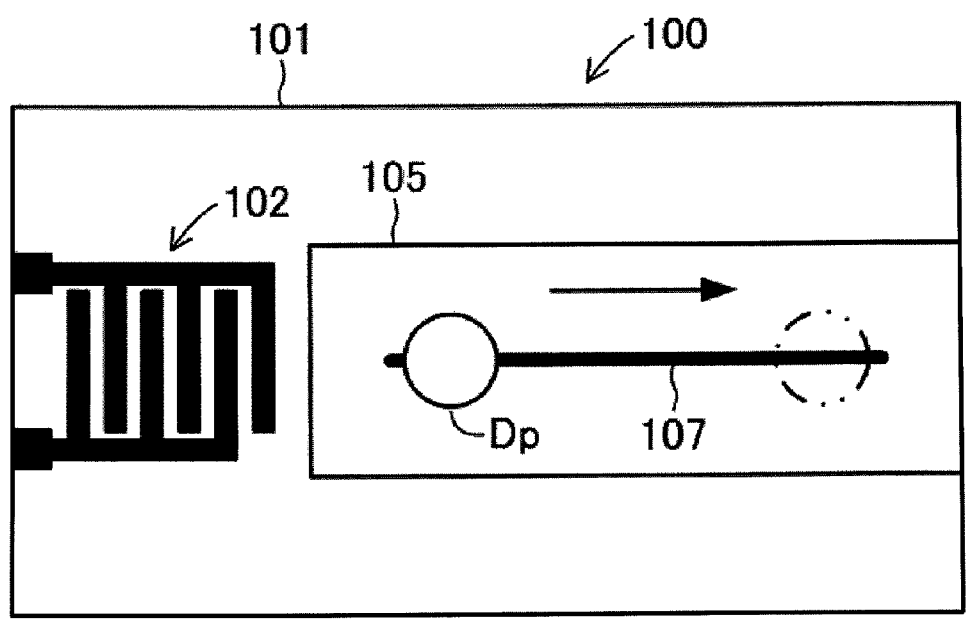
FIG. 4 is a summary plane view schematically showing the configuration of the acoustic wave device of another modified example of the invention.

Further, in each of the above embodiments, transport path plates 105, 205 were used which had smoothly formed transport faces on which liquid drops Dp were transported. However, in order to precisely transport a liquid drop Dp, a guide may be provided on the transport path plate 105, 205 to guide the liquid drop Dp on the transport face of the liquid drop Dp. For example, as shown in FIG. 4, a guide 107 comprising a hydrophilic substance is provided on the transport path plate 105 (205), along the transport path over which the liquid drop Dp is transported. By this means, the liquid drop Dp displaced on the transport path plate 105 (205) is displaced along the guide 107, so that the liquid drop Dp can be precisely guided to the target position (the position indicated by the two-dot chain line in the figure). Also, in this case, a hydrophobic substance may be applied to portions of the transport path plate 105 (205) other than where the guide 107 is provided. By this means, the liquid drop Dp is repelled from portions onto which the hydrophobic substance has been applied, and the liquid drop Dp can be guided to the target position more precisely. When the substance to be transported is a particle or other solid, in place of a hydrophilic guide 107, a depression-shaped guide groove can be used as the guide 107. Such a guide 107 is particularly effective when transporting while changing the direction of transport of the substance to be transported.

Figure 5:
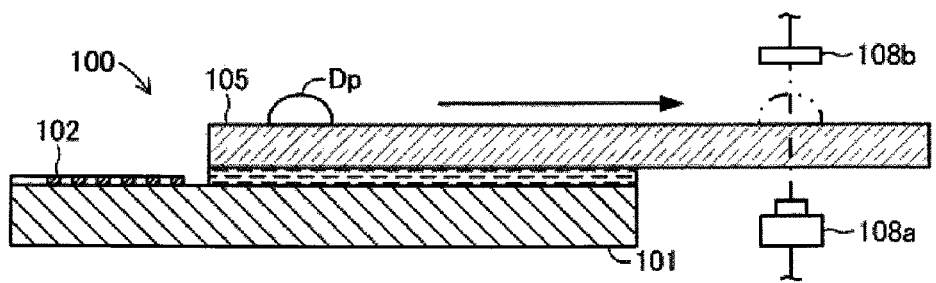
FIG. 5 is a summary cross-sectional view schematically showing the configuration of the acoustic wave device of another modified example of the invention.

Further, in each of the above embodiments, the transport path plates 105, 205 were placed so as to be within the bounds of the upper face of the piezoelectric substrate 101. However, the position of placement of the transport path plate 105, 205 is not limited thereto, so long as placement is such that longitudinal waves arising from surface acoustic waves occurring in the piezoelectric substrate 101 propagate. That is, as shown in FIG. 5, the transport path plate 105 (205) may be placed in a state of protruding from the edge portion of the piezoelectric substrate 101. By this means, compared with an acoustic wave device of the prior art, in which the transportable range of a liquid drop Dp was limited to the piezoelectric substrate 101, the transportable range of a liquid drop Dp can be expanded economically. As a result, the range of application and fields of application of acoustic wave devices 100, 200 can be expanded.

For example, as shown in FIG. 5, a laser light source 108a is placed below the portion of the transport path plate 105 (205) protruding from the edge portion of the piezoelectric substrate 101, and a photodetector 108b is placed above this protruding portion. And, laser light from the laser light source 108a irradiates a liquid drop Dp (indicated by a two-dot chain line in the figure) which has been transported to the portion of the transport path plate 105 (205) protruding from the edge portion of the piezoelectric substrate 101, and the light quantity of laser light passing through the liquid drop Dp is received by the photodetector 108b. By this means, optical characteristics of the liquid drop Dp can be measured. That is, properties of the liquid drop Dp can be investigated based on optical characteristics of the liquid drop Dp. As a sensor which can measure optical characteristics of a liquid drop Dp in this way, in addition to a laser light source 108a and photodetector 108b, a surface plasmon sensor or similar can be used.

Further, in each of the above embodiments, the transport path plates 105, 205 were formed from transparent glass material. However, the material of the transport path plates 105, 205 is not limited to this, so long as the material is such that a liquid drop Dp can be caused to be displaced by radiation pressure arising from surface acoustic waves occurring in the piezoelectric substrate 101. That is, in addition to glass materials, a transport path plate 105, 205 may be formed from a ferrous material or a nonferrous material. By means of these also, advantageous results similar to those of the above embodiments can be expected. When performing optical measurements, microscope observations, or similar of a liquid drop Dp after transport by the acoustic wave devices 100, 200, the transport path plate 105, 205 may be formed from a material which transmit light rays. Also, even in cases in which a used transport path plate 105, 205 is cleaned and reused, the extent of degradation of, damage to, and cleaning of the transport plate 105, 205 can easily be checked.

Further, in each of the above embodiments, a configuration was employed in which a single liquid drop Dp was placed on a transport path plate 105, 205 and transported. However, in an acoustic wave device 100, 200 of this invention, two or more liquid drops Dp, existing physically separated along the direction of propagation of surface acoustic waves, can be transported simultaneously. Specifically, in for example the acoustic wave device 200 shown in FIG. 2 above, with a liquid drop Dp positioned at the electrodes 206a, 206b (indicated by the two-dot chain line in the center of the figure), a new liquid drop Dp is placed on the left edge of the transport path plate 205 in the figure (indicated by a solid line in the figure). And, by operating the AC power supply 104, surface acoustic waves are caused to be generated from the piezoelectric substrate 101. By this means, longitudinal waves radiated to the water layer W propagate in the water layer W and to the transport path plate 205. That is, longitudinal waves propagate in the transport path plate 205 from portions in contact with the water layer W. Consequently, a liquid drop Dp positioned on the downstream side of propagation of surface acoustic waves (the liquid drop Dp positioned on the electrodes 206a, 206b) is displaced by the longitudinal waves propagating from the side upstream of the liquid drop Dp. Consequently, two or more liquid drops Dp, existing physically separated along the direction of propagation of surface acoustic waves, can be transported simultaneously. By this means, liquid drops Dp can be supplied continuously onto the transport path plate 205, so that transport and measurement of liquid drops Dp can be performed efficiently. As a result, the range of application and fields of application of acoustic wave devices 200 (100) can be expanded.

Figure 6:
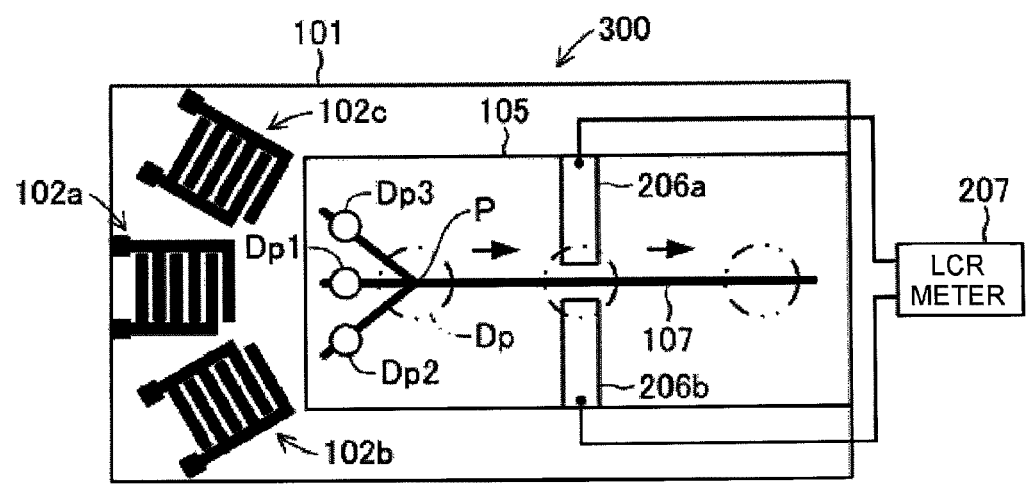
FIG. 6 is a summary plane view schematically showing the configuration of the acoustic wave device of another modified example of the invention.

Further, in each of the above embodiments, a configuration was employed in which one excitation electrode 102 was provided on the piezoelectric substrate 101; but the configuration is not limited thereto. That is, a configuration may be employed in which a plurality of excitation electrodes 102 may be placed on the piezoelectric substrate 101. For example, in FIG. 6, an acoustic wave device 300 is shown in which three excitation electrodes 102a, 102b, 102c are provided on the piezoelectric substrate 101 in the acoustic wave device 200 shown in FIG. 2. These three excitation electrodes 102a, 102b, 102c are connected to an AC power supply 104, not shown, and are configured such that the operation of each can be controlled independently. Also, guides 107 having hydrophilic properties are provided on the piezoelectric substrate 101 of this acoustic wave device 300, from the sides of the excitation electrodes 102a, 102b, 102c toward the electrodes 206a, 206b.

When using the acoustic wave device 300 configured in this way, an operator places liquid drops Dp1, Dp2, Dp3 on the transport path plate 205 corresponding to the placement positions of the excitation electrodes 102a, 102b, 102c. And, by starting operation of the AC power supply 104, the operator generates surface acoustic waves on the piezoelectric substrate 101. By this means, the liquid drops Dp1, Dp2, Dp3 on the transport path plate 205 begin displacement along the guides 107. And, the three liquid drops Dp1, Dp2, Dp3 become a single liquid drop Dp (indicated by the two-dot chain line at the left end in the figure) at the point P at which the guides 107 extending from the sides of the excitation electrodes 102a, 102b, 102c merge. In this case, the liquid drops Dp which has become a single member is uniformly stirred and mixed by longitudinal waves propagating to the transport path plate 205.

Next, the operator operates the AC power supply 104, and halts operation of the excitation electrodes 102b, 102c. By this means, the liquid drop Dp is transported toward the electrodes 206a, 206b by only surface acoustic waves generated by the excitation electrode 102a (indicated by the two-dot chain line in the center of the figure). Subsequent operation is similar to that of the above embodiments, and an explanation is omitted. In this way, by providing excitation electrodes 102a, 102b, 102c for each of the liquid drops Dp1, Dp2, Dp3, transport can be performed for each of the liquid drops Dp1, Dp2, Dp3, and the liquid drops Dp1, Dp2, Dp3 can be intermixed and transported as well.

Further, in place of the above modified example, or in addition, a liquid drop Dp can also be transported by synthesizing the surface acoustic waves occurring due to each of a plurality of excitation electrodes 102. In this case, by adjusting the propagation directions and intensities of the surface acoustic waves generated by each of the excitation electrodes 102, the transport direction and transport velocity of the liquid drop Dp being transported can also be modified. And further, in place of the above modified example, or in addition, the surface acoustic waves occurring due to the plurality of excitation electrodes 102 can be combined to transport the liquid drop Dp. For example, by placing excitation electrodes 102 for each transport direction of the liquid drop Dp, the liquid drop Dp can also be transported along a prescribed path. As a result, the range of application and fields of application of acoustic wave devices 300 can be expanded.

Figure 7:
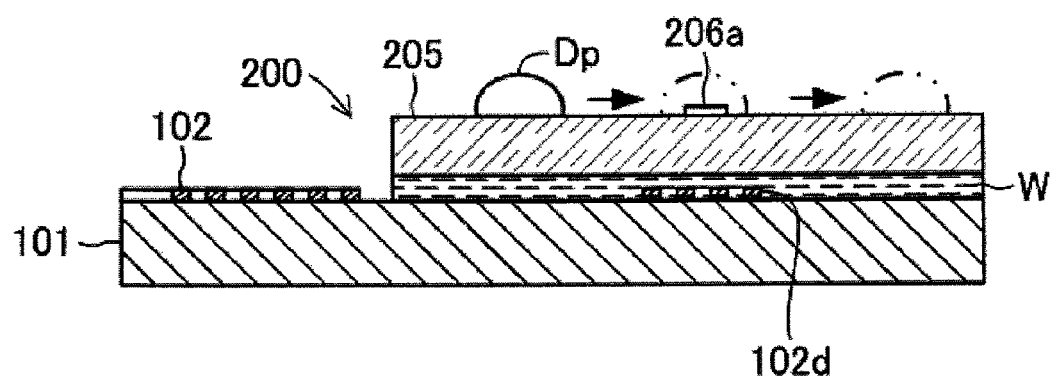
FIG. 7 is a summary cross-sectional view schematically showing the configuration of the acoustic wave device of another modified example of the invention; and, FIG. 8 is a summary plane view schematically showing the configuration of the acoustic wave device of another modified example of the invention.

Further, in place of the above modified example, or in addition, an excitation electrode 102 may be provided on the piezoelectric substrate 101 on which is placed the transport path plate 105, 205. For example, as shown in FIG. 7, an excitation electrode 102d may be provided at the position on the piezoelectric substrate 101 corresponding to the placement position of the electrodes 206a, 206b provided on the transport path plate 205 of the acoustic wave device 200 shown in FIG. 2. By this means, after measurement of the liquid drop Dp by the electrodes 206a, 206b (indicated by the two-dot chain line on the left side in the figure), by operating the excitation electrode 102d, the liquid drop Dp on the electrodes 206a, 206b can be displaced (indicated by the two-dot chain line on the right side in the figure). Such a configuration in which an excitation electrode 102 is provided on the piezoelectric substrate 101 on which is placed the transport path plate 105, 205 is particularly effective when transporting a liquid drop Dp positioned at a position removed from the excitation electrodes 102, or in other words, positioned at a position to which surface acoustic waves occurring due to the excitation electrodes 102 cannot readily propagate, to the next region. By this means, the range of application and fields of application of acoustic wave devices 100, 200 can be expanded.

Further, in each of the above embodiments, a liquid drop Dp of diameter approximately 3 mm was employed as the substance to be transported. However, the substance to be transported is not limited thereto, so long as the substance can be transported on a transport path plate 105, 205 utilizing surface acoustic waves. For example, particulate or powdered substances for transport can also be transported, either singularly or in a plurality. By this means also, advantageous results similar to those of the above embodiments can be expected.

Further, in each of the above embodiments, a water layer W was formed such that the water layer W was in contact with substantially the entire face of the transport path plate 105, 205. However, if a liquid drop Dp placed on the transport path plate 105, 205 can be displaced, the water layer W need not necessarily be formed such that the water layer W is in contact with the entire face of the transport path plate 105, 205. That is, the water layer W may be formed in portions, according to the transport path of the liquid drop Dp. By this means also, advantageous results similar to those of the above embodiments can be expected.

Further, in the above embodiments, the frequency of the alternating-current electric signals output from the AC power supply 104 was 50 kHz; but of course the frequency is not limited to this value. The frequency of the alternating-current electric signals output from the AC power supply 104 may be set appropriately according to the various members comprised by the acoustic wave device 100, 200, 300, 400, the characteristics of the substance to be transported (liquid drop) Dp to be transported, the transport velocity, and other transport conditions.

Further, in the other embodiment above, an LCR meter 207 was used in order to measure electric characteristics of a liquid drop Dp, and in addition electrodes 206a, 206b forming the sensor of the LCR meter 207 were placed on the transport path plate 205. However, the LCR meter 207 and electrodes 206a, 206b are only one example of measurement of the physical characteristics of a liquid drop Dp, and measurements are not limited thereto. That is, the measurement device and sensor may be selected appropriately according to the physical quantity of the liquid drop Dp for which measurement is desired. Here, a physical quantity related to a liquid drop Dp is a quantity, specific to the liquid drop Dp, which can be objectively measured, or a quantity which can be calculated from such a quantity, and may for example be mass, length, temperature, position, velocity, magnetic field, electrical resistance or electrical capacity or other electrical characteristics, optical transmissivity or reflectivity or other optical characteristics, radiation quantity or other characteristics related to X-rays, and similar.

For example, in the other embodiment described above, prior to displacing the liquid drop Dp, the LCR meter 207 is caused to be operated in advance. And, the operator begins displacement of the liquid drop Dp and, by monitoring changes in each of the values of the reactance L, capacitance C, and resistance R measured by the LCR meter 207, positioning of the liquid drop Dp on the electrodes 206a, 206b can be confirmed. That is, the electrodes 206a, 206b can be used as sensors to detect the position of the liquid drop Dp which is displaced on the transport plate 207.

Hence, for example as shown in FIG. 5, a laser light source 108a and photodetector 108b to measure the light quantity of light rays passing through a liquid drop Dp can be placed at a portion different from the transport path plate 105 and used as a portion of the configuration of the acoustic wave device 100. By this means, properties of the liquid drop Dp can be investigated in addition to transporting of the liquid drop Dp, so that the range of application and fields of application of acoustic wave devices 100 can be expanded. In cases in which there exist a plurality of types of measurements to be performed for a liquid drop Dp, as in the other embodiment described above, a transport path plate 205 can be prepared for each type of measurement of the liquid drop Dp, and in addition sensors can be placed on the transport path plates 205, so that the piezoelectric substrate 101 on which excitation electrodes 102 are placed can be used in common in a plurality of measurements. That is, various types of measurements of a liquid drop Dp can be performed economically. Also, a plurality of sensors can be placed on a single transport path plate 205. By this means, a plurality of measurements can be performed on a single transport path plate 205, and various properties of a single liquid drop Dp can be investigated.

Further, in the other embodiment described above, operation of the AC power supply 104 and of the LCR meter 207 was controlled through manual operation by an operator. However, this operation can be centrally controlled by a computer. That is, transport of a liquid drop Dp to a measurement region, measurement in the measurement region, and ejection from the measurement region, can be automated through computer control. By this means, measurement tasks by an acoustic wave device 200 can be performed efficiently, and the range of application and fields of application of acoustic wave devices 200 can be expanded.

Figure 8:
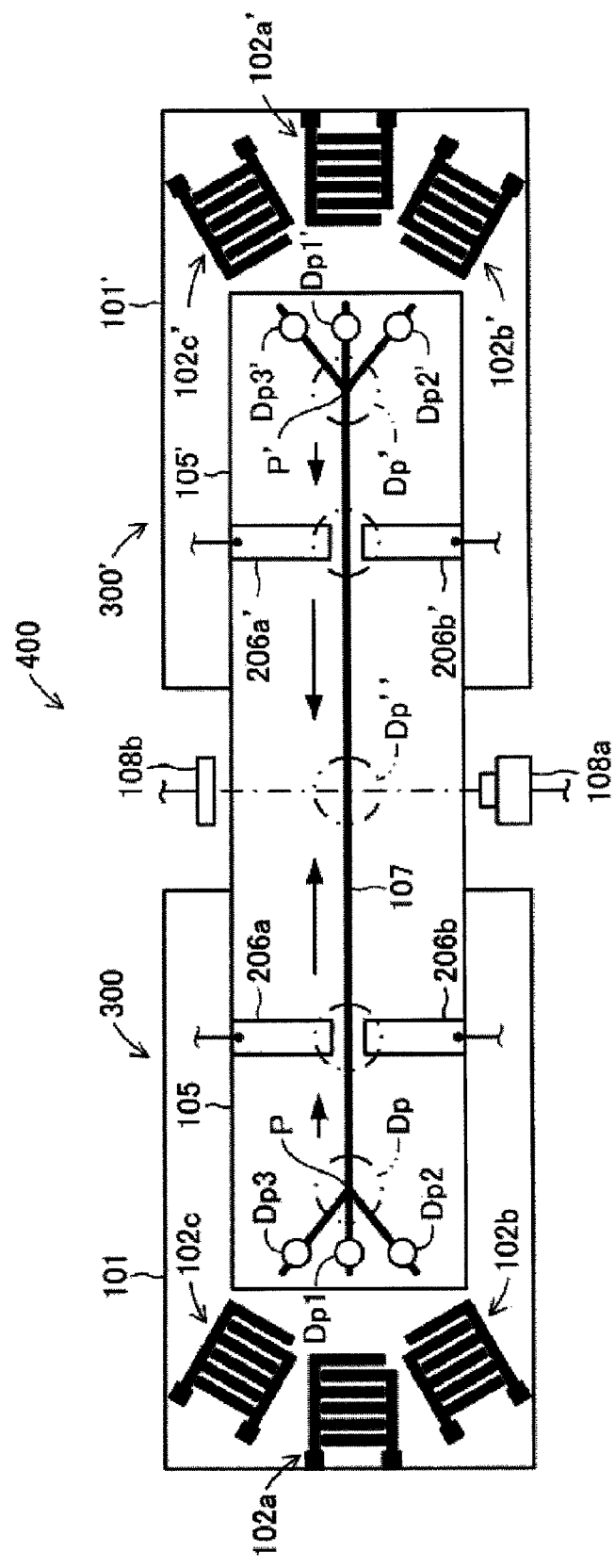

In this invention, of course the above-described embodiment, other embodiment, and modified examples can be combined and executed as appropriate. For example, the acoustic wave device 400 shown in FIG. 8 is configured by preparing two of the acoustic wave devices 300 shown in FIG. 6, and with a transport path plate 205 used in common, placing the two acoustic wave devices 300, 300' in mutual opposition, and placing a laser light source 108a and photodetector 108b so as to surround the center portion of the transport path plate 205. In other words, the acoustic wave device 400 is configured in a bridge form, with the transport path plate 205 spanning the acoustic wave device 300 and the acoustic wave device 300'.

This acoustic wave device 400 transports and mixes the liquid drops Dp1, Dp2, Dp3 by means of surface acoustic waves due to the excitation electrodes 102a, 102b, 102c on the left side in the figure, to create a liquid drop Dp (indicated by the two-dot chain line on the left end in the figure), further transports the newly created liquid drop Dp, and measures the electric characteristics using the electrodes 206a, 206b. Thereafter, the liquid drop Dp is further transported and positioned in the center portion of the transport path plate 205 (indicated by the two-dot chain line in the center of the figure). On the other hand, the acoustic wave device 400 transports and mixes the liquid drops Dp1', Dp2', Dp3' by means of surface acoustic waves due to the excitation electrodes 102a', 102b', 102c' on the right side in the figure, to create a liquid drop Dp' (indicated by the two-dot chain line on the right end in the figure), further transports the newly created liquid drop Dp', and measures the electric characteristics using the electrodes 206a', 206b'. Thereafter, the liquid drop Dp' is further transported and positioned in the center portion of the transport path plate 205 (indicated by the two-dot chain line in the center of the figure).

That is, the liquid drop Dp and liquid drop Dp' are mixed in the center portion of the transport path plate 205 (indicated by the two-dot chain line in the center of the figure). And, optical characteristics of the mixed liquid drop Dp" are measured by the laser light source 108a and photodetector 108b. In this way, by appropriately combining the above-described embodiment, other embodiment, and modified examples, the range of application and fields of application of acoustic wave devices 100, 200, 300, 400 can be further expanded.

The invention claimed is:
1. An acoustic wave device, which comprises a piezoelectric substrate that generates surface acoustic waves by means of the piezoelectric effect, and an excitation electrode that excites the surface acoustic waves on a surface of the piezoelectric substrate, and in which the surface acoustic waves generated on the surface of the piezoelectric electrode by the excitation electrode are used to transport a substance to be transported, wherein a transport path plate, forming a transport path for the substance to be transported, is placed on a propagation face on which propagate the surface acoustic waves generated on the surface of the piezoelectric substrate, with a liquid layer interposed between the transport path plate and the piezoelectric substrate.

2. The acoustic wave device according to claim 1, further comprising a sensor which detects a physical quantity relating to the substance to be transported on the transport path plate.

3. The acoustic wave device according to claim 2, wherein the sensor is placed on the transport path plate.

4. The acoustic wave device according to claim 3, wherein the excitation electrode is placed at a position on the piezoelectric substrate corresponding to the sensor placed on the transport path plate.

5. The acoustic wave device according to claim 2, further comprising a control device, which controls operations of the excitation electrode and of the sensor.

6. The acoustic wave device according to claim 1, wherein the transport path plate is placed in a state of protruding from the propagation face.

7. The acoustic wave device according to claim 1, wherein a plurality of excitation electrodes are placed on the piezoelectric substrate.

8. The acoustic wave device according to claim 7, wherein the plurality of excitation electrodes are placed at positions and in orientations to transport the substance to be transported by synthesis or combination of the surface acoustic waves excited by the mutually different excitation electrodes.

9. The acoustic wave device according to claim 1, wherein the transport path plate comprises a guide that guides the substance to be transported in a prescribed direction.

10. The acoustic wave device according to claim 1, wherein the transport path plate is formed of an object which transmits light rays.

11. The acoustic wave device according to claim 1, wherein the liquid layer is formed of water.

12. The acoustic wave device according to claim 1, wherein the liquid layer is formed to have a thickness of several micrometers or greater, and several tens of micrometers or less.

* * * * *